United States Patent
Ha et al.

(10) Patent No.: US 11,916,425 B2
(45) Date of Patent: Feb. 27, 2024

(54) METHOD FOR CHARGING BATTERY AND ELECTRONIC DEVICE APPLYING THE METHOD

(71) Applicant: Samsung Electronics Co., Ltd., Suwon-si (KR)

(72) Inventors: Youngmi Ha, Suwon-si (KR); Hyunjun Oh, Suwon-si (KR); Jungmin Lee, Suwon-si (KR); Kuchul Jung, Suwon-si (KR); Sungjoon Cho, Suwon-si (KR); Hansol Choi, Suwon-si (KR); Kyounghoon Kim, Suwon-si (KR); Seongil Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 16/738,477

(22) Filed: Jan. 9, 2020

(65) Prior Publication Data
US 2020/0266648 A1 Aug. 20, 2020

(30) Foreign Application Priority Data
Feb. 14, 2019 (KR) .................. 10-2019-0017382

(51) Int. Cl.
*H02J 7/00* (2006.01)

(52) U.S. Cl.
CPC .... *H02J 7/007182* (2020.01); *H02J 7/00714* (2020.01); *H02J 7/0048* (2020.01)

(58) Field of Classification Search
CPC .. H02J 7/007182; H02J 7/00712; H02J 7/007; H02J 7/0069; H02J 7/042; H02J 7/00714
See application file for complete search history.

(56) References Cited

U.S. PATENT DOCUMENTS

| 9,634,497 B2 | 4/2017 | Baek et al. |
| 2010/0207583 A1* | 8/2010 | Tanaka ................. H02J 7/0071 320/134 |

(Continued)

FOREIGN PATENT DOCUMENTS

| CN | 108649595 A * 10/2018 ........... H01M 10/425 |
| JP | 2007-228701 A    9/2007 |

(Continued)

OTHER PUBLICATIONS

Machine translation of WO-2018068523-A1. (Year: 2018).*

(Continued)

*Primary Examiner* — John T Trischler
*Assistant Examiner* — Pamela J Jeppson
(74) *Attorney, Agent, or Firm* — Jefferson IP Law, LLP

(57) ABSTRACT

An electronic device is provided. The electronic device includes a housing, a battery disposed inside the housing, a power management module for controlling charging of the battery, and at least one processor operationally connected with the battery and the power management module. The at least one processor is provided to direct a plurality of charging intervals while charging the battery, each of the plurality of charging intervals having a target voltage, to alternately charge the battery in a first mode and in a second mode through the power management module, wherein a charging current flowing into the battery is uniformly maintained in the first mode and a voltage of the battery is uniformly maintained in the second mode, and to switch the first mode to the second mode when the voltage of the battery reaches the target voltage in the first mode.

15 Claims, 7 Drawing Sheets

(56) References Cited

U.S. PATENT DOCUMENTS

| | | | | |
|---|---|---|---|---|
| 2012/0086406 A1* | 4/2012 | Maeagawa | ............... | H02J 7/008 320/162 |
| 2012/0133338 A1* | 5/2012 | Suzuki | .................. | H01M 4/525 320/160 |
| 2012/0280663 A1 | 11/2012 | Lim et al. | | |
| 2015/0340885 A1 | 11/2015 | Baek et al. | | |
| 2016/0190843 A1* | 6/2016 | Yang | ...................... | G01R 31/36 320/152 |
| 2019/0237975 A1 | 8/2019 | Song et al. | | |
| 2020/0106290 A1* | 4/2020 | Ma | .......................... | H02J 50/12 |

FOREIGN PATENT DOCUMENTS

| | | | |
|---|---|---|---|
| JP | 2009-22078 A | | 1/2009 |
| JP | 2009-33843 A | | 2/2009 |
| JP | 2009033843 A | * | 2/2009 |
| KR | 10-1525727 B1 | | 6/2015 |
| KR | 101525727 B1 | * | 6/2015 |
| KR | 10-2015-0133587 A | | 11/2015 |
| KR | 10-2016-0095752 A | | 8/2016 |
| KR | 10-2016-0103463 A | | 9/2016 |
| KR | 10-2017-0096831 A | | 8/2017 |
| KR | 10-2018-0103412 A | | 9/2018 |
| WO | WO-2018068523 A1 | * | 4/2018 ............ H02J 7/0019 |

OTHER PUBLICATIONS

Machine translation of JP-2009033843-A. (Year: 2009).*
Machine translation of KR-101525727-B1. (Year: 2015).*
Wen-Yeau Chang, "The State of Charge Estimating Methods for Battery: A Review", International Scholarly Research Notices, vol. 2013, Article ID 953792, 7 pages, 2013. (Year: 2013).*
Perez, Hector Eduardo, et al. "Optimal charging of Li-ion batteries with coupled electro-thermal-aging dynamics." IEEE Transactions on Vehicular Technology 66.9 (2017): 7761-7770. (Year: 2017).*
Beaston et al.; CN-108649595—A machine translated description; 2018 (Year: 2018).*
European Search Report dated Feb. 27, 2020; European Appln. No. 20151488.2-1202.
International Search Report dated Apr. 29, 2020; International Appln. No. PCT/KR2019/018544.
Korean Office Action with English translation dated Dec. 14, 2023; Korean Appln. No. 10-2019-0017382.

* cited by examiner

METHOD FOR CHARGING BATTERY AND ELECTRONIC DEVICE APPLYING THE METHOD

CROSS-REFERENCE TO RELATED APPLICATION(S)

This application is based on and claims priority under 35 U.S.C. § 119(a) of a Korean patent application number 10-2019-0017382, filed on Feb. 14, 2019, in the Korean Intellectual Property Office, the disclosure of which is incorporated by reference herein in its entirety.

BACKGROUND

1. Field

The disclosure relates to a method for charging a battery alternately between a first mode wherein a charging current is uniformly maintained and a second mode where a voltage is uniformly maintained, and relates to a technology for implementing an electronic device applying the method.

2. Description of Related Art

Any number of electronic devices may operate for a certain time by receiving power stored in a battery while being separated from an external power source. The battery may be discharged while supplying the power to the electronic device. When the electronic device is connected to the external power source, a discharged battery may be charged.

The electronic device may have a plurality of charging intervals according to a voltage of the battery or a charging current of the battery. The electronic device may differently set the charging current flowing into the battery in each of the charging intervals. The electronic device may maintain the charging current at a high state in an initial charging interval in which the voltage of the battery is low to maintain a charging speed quickly. The electronic device may stably charge the battery by gradually decreasing the charging current as the voltage of the battery increases.

An electronic device of the related art may change a magnitude of the charging current when a voltage of the battery reaches a specified voltage after dividing the charging interval for each voltage of the battery. An amount of charge of the battery may be proportional to the integral of the charging current. When the magnitude of the charging current is changed sharply, the amount of charge of the battery is sharply decreased, which may cause a loss of a charging time.

In addition, when a current greater than the magnitude of the charging current is supplied in the charging interval to reduce the loss of the charging time or the time point of changing the magnitude of the current is later than the end of the charging interval when the specified voltage is reached, the battery may overheat.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages, and to provide at least the advantages described below. Accordingly, an aspect of the disclosure is to provide a method for charging a battery while preventing overheating of the battery in a plurality of charging intervals and changing a magnitude of the charging current without losing charging time, and an electronic device to which the method is applied.

Additional aspects will be set forth in part in the description which follows and, in part, will be apparent from the description, or may be learned by practice of the presented embodiments.

In accordance with an aspect of the disclosure, an electronic device is provided. The electronic device includes a housing, a battery disposed inside the housing, a power management module configured to control charging the battery, and at least one processor operationally connected with the battery and the power management module. The at least one processor may be configured to direct a plurality of charging intervals while charging the battery, each of the plurality of charging intervals having a target voltage, to alternately charge the battery in a first mode and in a second mode through the power management module, wherein a charging current flowing into the battery is uniformly maintained in the first mode and a voltage of the battery is uniformly maintained in the second mode, and to switch the first mode to the second mode when the voltage of the battery reaches the target voltage in the first mode.

In accordance with another aspect of the disclosure, a method of charging a battery of an electronic device is provided. The method includes performing charging in a first mode in which first charging current is uniformly maintained in a first interval having a first target voltage, identifying whether a state of charge (SoC) of the battery reaches a first charging state value, obtaining a first value that is a charging current flowing into the battery and a second value that is an average value of the charging current flowing into the battery for a specified time, identifying whether a greater value of the first value and the second value is less than a first reference current value for at least a specified number of times, performing charging in a second mode in which the first target voltage is maintained while gradually changing the first charging current to a second charging current, performing charging in the first mode by entering a second interval having a second target voltage different from the first target voltage, and switching the first mode to the second mode when a voltage of the battery reaches the second target voltage.

In accordance with another aspect of the disclosure, an electronic device is provided. The electronic device includes a housing, a battery disposed inside the housing, a power management module configured to control charging the battery, and at least one processor operationally connected with the battery and the power management module. The at least one processor may be configured to set a plurality of target voltages for a plurality of charging intervals, respectively, to identify whether a voltage of the battery reaches a target voltage in a corresponding charging interval among the plurality of target voltages, while charging the battery in a first mode in which a charging current of the battery is uniformly maintained, to obtain a first value that is a strength of a current charging current and a second value that is an average value of the charging current for a specified time, to identify whether a greater value of the first value and the second value is equal to or less than a first reference current value for at least a specified number of times, and to maintain the target voltage while gradually changing a first charging current to a second charging current that is less than the first charging current to switch the first mode in which the first charging current is uniformly maintained to a second mode in which the target voltage is uniformly maintained, in a first interval of the plurality of charging intervals.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
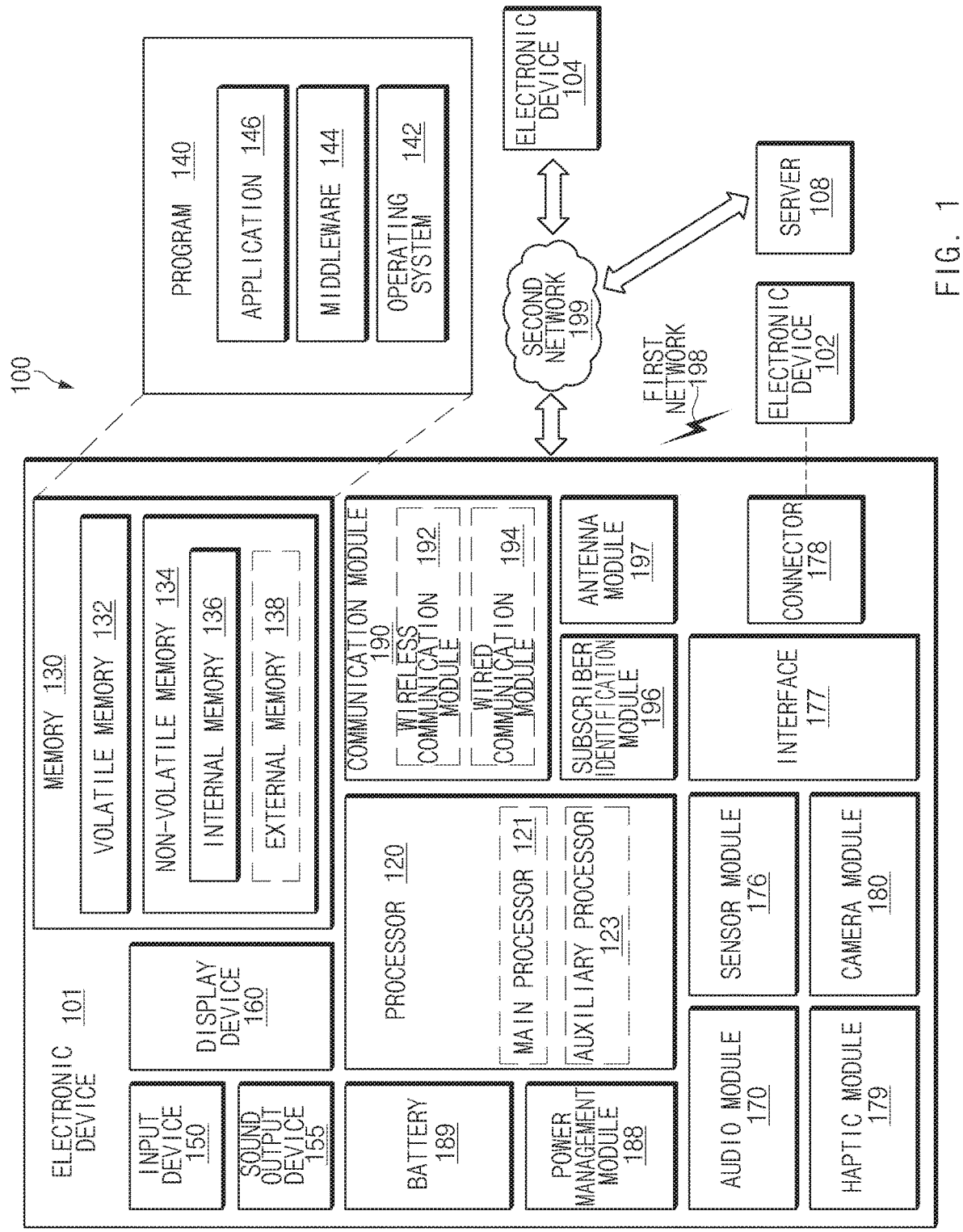
FIG. 1 is a block diagram illustrating an electronic device in a network environment according to various embodiments of the disclosure.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of the functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include one or more of an internal memory 136 or external memory 138.

The program 140 may be stored in the memory 130 as software, and may include, for example, an operating system (OS) 142, middleware 144, or an application 146.

The input device 150 may receive a command or data to be used by other components (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
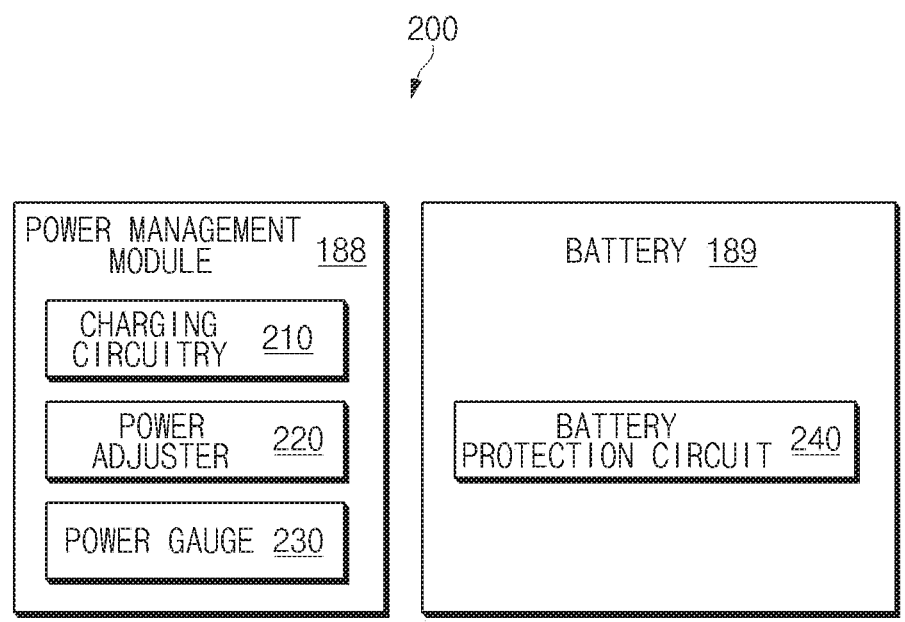
FIG. 2 is a block diagram illustrating a power management module and a battery according to various embodiments of the disclosure.

FIG. 2 is a block diagram illustrating a power management module and battery according to various embodiments of the disclosure.

Referring to FIGS. 1 and 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

Figure 3:
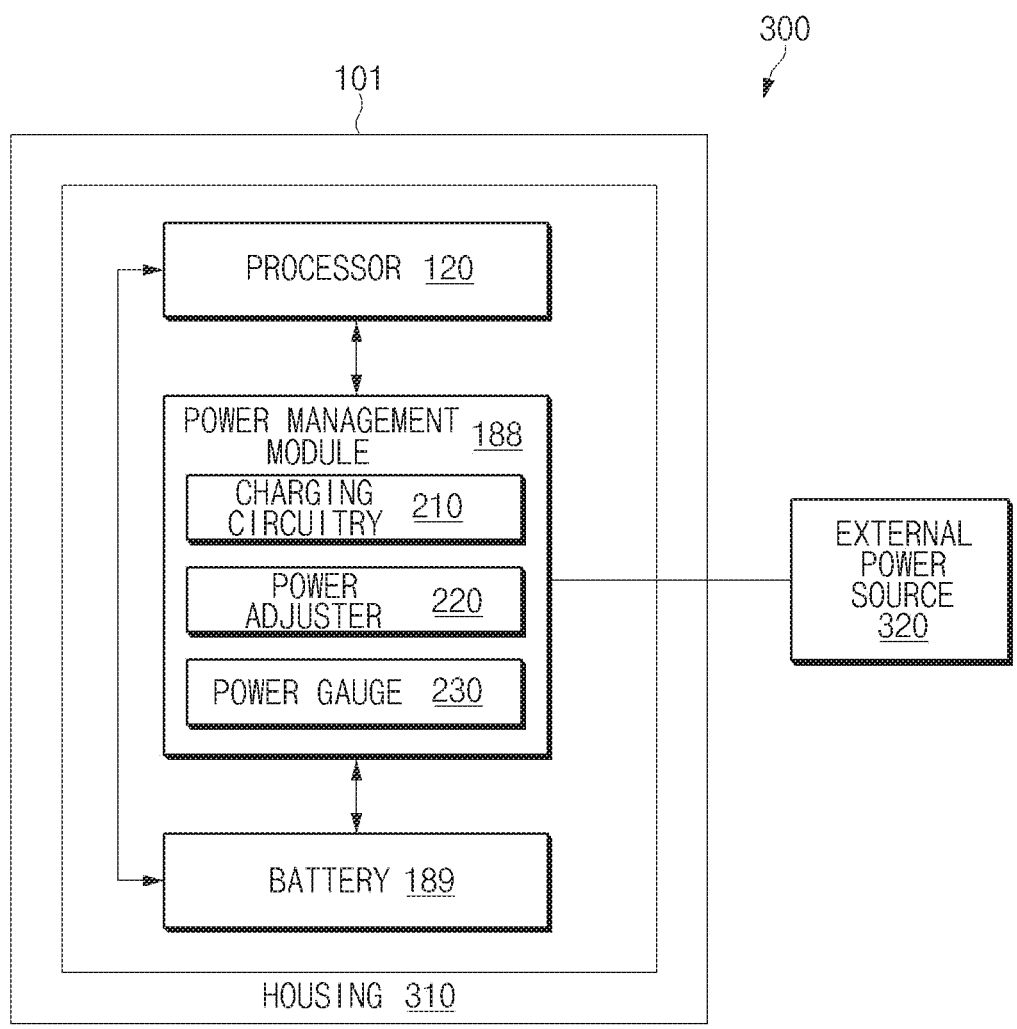
FIG. 3 is a block diagram illustrating an electronic device connected to an external power source, according to an embodiment of the disclosure.

FIG. 3 is a block diagram illustrating an electronic device connected to an external power source, according to an embodiment of the disclosure.

Referring to FIGS. 1, 2, and 3, according to an embodiment, block diagram 300 illustrates that the electronic device 101 may include the battery 189, the power management module 188, and the processor 120 that are disposed inside a housing 310.

According to an embodiment, the housing 310 may form an outline of the electronic device 101. The housing 310 may include a front plate that forms a front surface or a first surface of the electronic device 101, a back plate that forms a back surface or a second surface of the electronic device 101, and a surface member that surrounds a space between the front plate and the back plate. The housing 310 may protect the battery 189, the power management module 188, and the processor 120 disposed therein from an external shock.

According to an embodiment, the battery 189 may be disposed inside the housing 310. The battery 189 may supply power for operating the electronic device 101.

According to an embodiment, the power management module 188 may include the charging circuit 210, the power adjuster 220, and the power gauge 230. The power management module 188 may be connected to an external power source 320.

According to an embodiment, the charging circuit 210 may be connected to the external power source 320. The charging circuit 210 may receive the power from the external power source 320. The power management module 188 may receive the power from the external power source 320 through the charging circuit 210. The charging circuit 210 may transfer the power to the battery 189. For example, the charging circuit 210 may allow a charging current to flow into the battery 189.

According to an embodiment, the charging circuit 210 may set a maximum charging current flowing into the battery 189. The charging circuit 210 may set a full voltage at which the battery 189 is fully charged. The charging circuit 210 may perform a regulation operation such that the battery 189 has a specified battery voltage.

According to an embodiment, the power gauge 230 may calculate a state of charge (SoC) related to a current capacity of the battery 189. For example, the power gauge 230 may calculate the charging current flowing into the battery 189 and a consumption current used by the electronic device 101.

According to an embodiment, the power management module 188 may be implemented as a power management integrated circuit (PMIC). The power management module 188 may control the battery 189. For example, the power management module 188 may control the state of charge, a voltage, a charging current, and/or a consumption current of the battery 189. The power management module 188 may control charging and/or discharging of the battery 189.

According to an embodiment, the processor 120 may be operationally connected to the battery 189 and the power management module 188. The processor 120 may obtain information with regard to the battery 189 through the charging circuit 210 and the power gauge 230 of the power management module 188. For example, the processor 120 may recognize information with regard to the state of charge, the voltage, the charging current, and/or the consumption current of the battery 189. The processor 120 may process values of the state of charge, the voltage, the charging current, and/or the consumption current of the battery 189 that are calculated by the charging circuit 210 and the power gauge 230. For example, the processor 120 may average or correct the values of the state of charge, the voltage, the charging current, and/or the consumption current of the battery 189. The processor 120 may manage a multi-step charging algorithm of the battery 189 as a whole.

Figure 4:
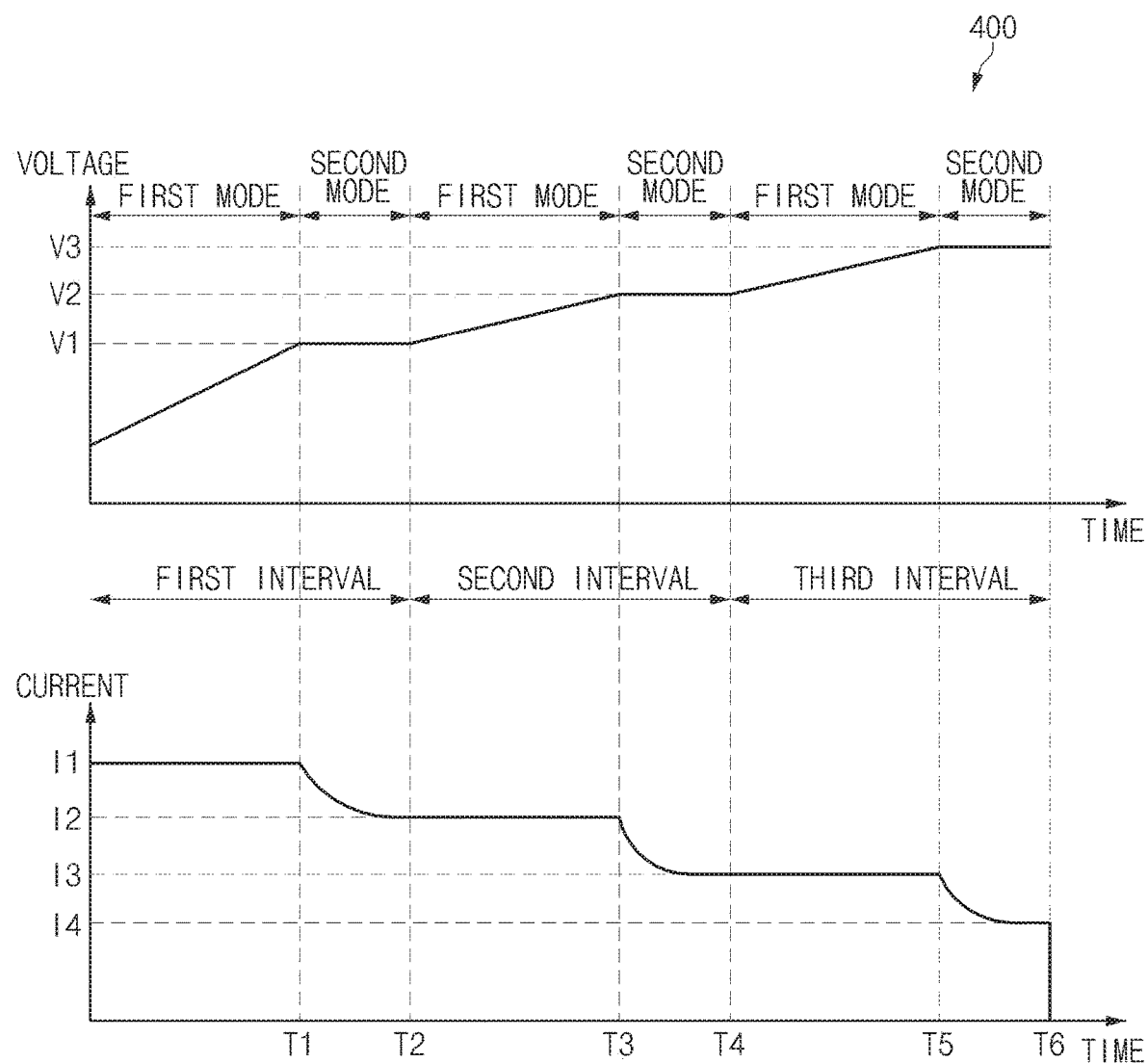
FIG. 4 is a graph illustrating a method of controlling charging by an electronic device according to an embodiment of the disclosure.

FIG. 4 is a graph illustrating a method of controlling charging by an electronic device (e.g., the electronic device 101 of FIG. 3) according to an embodiment of the disclosure.

Referring to FIG. 4, according to an embodiment, graph 400 illustrates an electronic device, such as the electronic device 101, may have a plurality of charging intervals while charging. For example, the electronic device 101 may have a first interval having a first target voltage V1, a second interval having a second target voltage V2, and a third interval having a third target voltage V3. The processor (e.g., the processor 120 of FIG. 3) of the electronic device 101 may set a target voltage of each of the plurality of charging intervals. The target voltage may be a maximum voltage value that the battery 189 may have in each of the plurality of charging intervals. The plurality of charging intervals may have an interval operating in a first mode and an interval operating in a second mode.

According to an embodiment, the interval operating in the first mode may be an interval operating in a constant current (CC) mode in which the charging current flowing into the battery 189 is uniform. In the interval operating in the first mode, the voltage of the battery 189 may increase. In the interval operating in the first mode, the charging speed of the battery 189 may be relatively high.

According to an embodiment, the interval operating in the second mode may be an interval operating in a constant voltage (CV) mode in which the voltage of the battery 189 is uniform. In the interval operating in the second mode, the charging current flowing into the battery 189 may decrease. In the interval operating in the second mode, the charging speed of the battery 189 may be relatively low.

According to an embodiment, when the voltage of the battery 189 reaches the target voltage, the processor 120 may switch from the first mode operation to the second mode operation and then charge the battery 189.

According to an embodiment, when the voltage of the battery 189 is lower than the target voltage, the processor 120 may control the power management module 188 to charge the battery 189 in the first mode operation. The processor 120 may increase the voltage of the battery 189 in proportion to time while uniformly maintaining the charging current of the battery 189 until a time before the voltage of the battery 189 reaches the target voltage. For example, the processor 120 may increase the voltage of the battery 189 to be proportional to time to a first target voltage V1 while maintaining the charging current as a first current I1 from an initial time to a first time T1. The processor 120 may increase the voltage of the battery 189 to a second target voltage V2 while maintaining the charging current as a second current I2 from a second time T2 to a third time T3. The processor 120 may increase the voltage of the battery 189 to a third target voltage V3 while maintaining the charging current as a third current I3 from a fourth time T4 to a fifth time T5.

According to an embodiment, when the voltage of the battery 189 is the target voltage, the processor 120 may control the power management module 188 to charge the battery 189 in the second mode operation. When the voltage of the battery 189 reaches the target voltage, the processor 120 may gradually decrease the charging current of the battery 189 while uniformly maintaining the voltage of the battery 189. The charging current of the battery 189 may be decreased in the form of an inverse function, an exponential function, and/or a logarithmic function to maintain the voltage of the battery 189 uniformly. For example, the processor 120 may gradually decrease the charging current from the first charging current I1 to the second charging current I2 while maintaining the voltage of the battery 189 as the first target voltage V1 from the first time T1 to the second time T2. The processor 120 may gradually decrease the charging current from the second charging current I2 to the third charging current I3 while maintaining the voltage of the battery 189 as the second target voltage V2 from the third time T3 to a fourth time T4. The processor 120 may gradually decrease the charging current from the third charging current I3 to the fourth charging current I4 while maintaining the voltage of the battery 189 as the third target voltage V3 from the fifth time T5 to a sixth time T6.

According to an embodiment, when the voltage of the battery 189 is a full voltage that is fully charged, the processor 120 may block the charging current after changing the charging current in the second mode operation. For example, when the third target voltage V3 is the full voltage, the processor 120 may change the charging current to the fourth charging current I4 until the sixth time T6, and then cut off the charging current after the sixth time T6.

Figure 5:
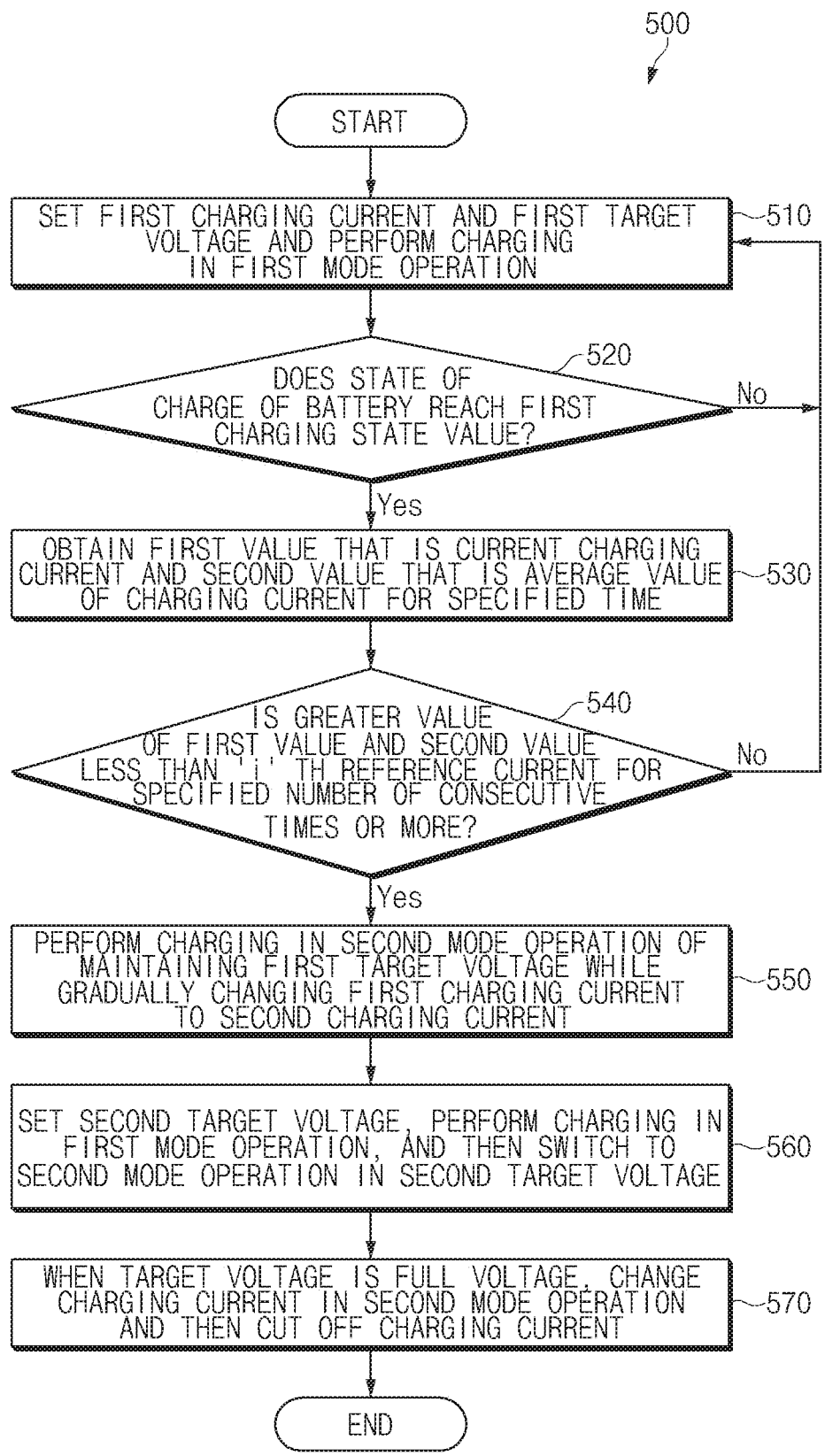
FIG. 5 is a flowchart describing a method of how an electronic device controls charging according to an embodiment of the disclosure.

FIG. 5 is a flowchart describing a method of how an electronic device (e.g., the electronic device 101 of FIG. 3) controls the charging according to an embodiment of the disclosure.

Referring to FIG. 5, according to an embodiment, in operation 510 of flowchart 500, the electronic device 101 may set the first charging current and the first target voltage and perform charging in the first mode operation. For example, the processor (e.g., the processor 120 of FIG. 3) of the electronic device 101 may set the charging current and the target voltage in each of the plurality of charging intervals. The power management module (e.g., the power management module 188 of FIG. 3) of the electronic device 101 may perform charging in the first mode operation in which the charging current is uniformly maintained when initially charging.

According to an embodiment, FIG. 5 illustrates a case in which the power management module 188 has no limitation of the charging current when charging the battery 189. The limitation of the charging current may mean a state in which the maximum charging current flowing into the battery 189 is limited by intentionally performing a control such as a heating control during charging. For example, the limitation of the charging current may occur when a heating algorithm is operated as an internal temperature of the electronic device 101 is high, or when the consumption current is generated due to an operation of the electronic device 101 like when the display (e.g., the display device 160 of FIG. 1) is turned on. That is, when a liquid crystal display (LCD) is not OFF and not in a sleep state, it may be regarded as a state of the limitation of the charging current. Because the processor 120 may control the charging current of the battery 189 in each of the plurality of charging intervals when there is no limitation of the charging current, the processor 120 may more easily control the charging speed and a state of charge than when the charging current is limited. The processor 120 may proceed charging without referring an amount of the charging current actually flowing into the battery 189 until the state of charge (SoC) of the battery 189 reaches a minimum charging state value in the corresponding charging interval in the state where the charging current is not limited.

According to an embodiment, in operation 520, the electronic device 101 may determine whether the state of charge of the battery (e.g., the battery 189 of FIG. 3) reaches a first charging state value. For example, the processor 120 of the electronic device 101 may measure a level of the battery 189 or the state of charge related to the current capacity through the power management module 188. The first charging state value may be the state of charge capable of maintaining a current charging interval. The processor 120 may set the first charging state value to the minimum charging state value in the corresponding charging interval. When the state of charge of the battery 189 reaches the first charging state value (operation 520-Yes), the processor 120 may proceed to operation 530. When the state of charge of the battery 189 does not reach the first charging state value (operation 520-No), the processor 120 returns to operation 510 and may maintain a state for proceeding charging of the battery 189 in the first mode operation.

According to an embodiment, the plurality of charging intervals may be a plurality of steps. Moving from one of the plurality of steps to a subsequent step may be referred to as performing a step-down. For example, the processor 120 may move from a first step to a second step when a condition of the step-down is satisfied in Table 1 below.

TABLE 1

| division | | first step | second step | Nth step |
|---|---|---|---|---|
| step-down condition | state of charge | 0%~first charging state value | first charging state value~ second charging state value | N-1th charging state value~ Nth charging state value |
| | charging current | equal to or less than rated charging current | equal to or less than third reference current value | equal to or less than Nth reference current value |
| allowable voltage, current | target voltage | first target voltage | second target voltage | Nth target voltage |
| | maximum charging current | first reference current value | second reference current value | Nth reference current value |

In Table 1, according to an embodiment, the first step may be maintained from the state of charge of 0% to the first state of charge. The first step, the second step, or the Nth step may be determined based on the state of charge. For example, when the state of charge is 0%, a charging may begin in the first step, and when the charging state value is a value between the first charging state value and the second charging state value, a charging may begin in the second step. In FIG. 5 and related descriptions, a case in which charging starts at 0% is illustrated. However, the disclosure is not limited thereto, and when the charging state value is different, the charging may be performed from the step corresponding to the charging state value. In the first step, the first reference current value may be used for the charging in the first mode operation. The first step may last until the state of charge reaches the first charging state value from the beginning.

According to an embodiment, each step may be divided based on the state of charge calculated from the power gauge 230. The state of charge may vary depending on characteristics and an amount of deterioration of the battery 189. When each step is set to a state of charge which is actually measured, the step is set to a value higher than the allowable state of charge in the corresponding charging interval, thereby causing overheating or overcharging of the battery 189. Accordingly, the processor 120 may correct the condition by the actual charging current measured by the battery 189 and the current consumed by the electronic device 101. For example, the processor 120 may set the first charging state value in the first step lower than the state of charge actually measured in the first target voltage that is the target voltage in the first step, to prevent damage of the battery 189.

According to an embodiment, when the state of charge of the battery 189 reaches the minimum charging state value in the corresponding charging interval, the processor 120 may consider the charging current flowing into the battery 189 as the step-down condition.

For example, when the processor 120 sets the first charging state value to about 20%, the first step may be maintained when the state of charge is about 0% or more and about 20% or less. When the full voltage of the battery 189 is about 4350 mV, the first target voltage may be set to about 4000 mV, which is about 92% of the full voltage. In addition, when the rated charging current of the battery 189 is about 4000 mA, the first reference current value may be set to about 4400 mA, which is about 1.1 times of the rated charging current. In this case, the voltage of the battery 189 may increase to about 4000 mV until the state of charge becomes about 20%, and the charging current of about 4400 mA may flow in.

According to an embodiment, in operation 530, the electronic device 101 may obtain a first value that is a current charging current and a second value that is an average value of the charging current for a specified time. The first value may be a current currently flowing into the battery 189. The first value may be a current excluding a current consumed by the electronic device 101 from a current flowing from the external power source (e.g., the external power source 320 of FIG. 3). The second value may be an average value of the current flowing into the battery 189 for the specified time.

According to an embodiment, in operation 540, the electronic device 101 may determine whether a greater value of the first value and the second value is less than the 'i'th (T is a natural number of 2 or more) reference current for a specified number of consecutive times or more. When the greater of the first value and the second value exceeds the 'i'th reference current or is not less than the 'i'th reference current for the specified number of consecutive times or more (operation 540-No), the processor 120 returns to operation 510 and may proceed charging in the first mode operation in the corresponding interval. The processor 120 may proceed to operation 550 when the greater value of the first value and the second value is less than the 'i'th reference current for the specified number of consecutive times or more (operation 540-Yes).

According to an embodiment, operation 540 may be performed in a second mode operation, which is a constant voltage (CV) interval in which the voltage of the battery 189 is maintained uniformly. For example, the first reference current may decrease up to about 1 C (4000 mA) in the first mode operation, which is a constant current (CC) interval, and may decrease up to about 0.72 C (2880 mA) in the second mode operation.

According to an embodiment, in operation 550, the electronic device 101 may perform charging in the second mode operation of maintaining the first target voltage while gradually changing the first charging current to the second charging current. When a situation in which a greater value of the first value immediately reflecting the current consumed by the electronic device 101 and the second value, which is the average charging current for a predetermined time, is greater than the reference current of the corresponding charging interval, is detected consecutively for the specified number of times or more, the processor 120 may move up the step that is the state of charge or a charging step. As illustrated in Table 1, the processor 120 may gradually decrease the maximum charging current from the first reference current value to the second reference current value when the state of charge reaches the first charging state value. For example, when setting the second reference current value as the rated charging current in Table 1, the processor 120 may set the voltage of the battery 189 to about 4000 mV through the power management module 188 when the state of charge reaches about 20%, and set the maximum charging current to gradually decrease from about 4400 mA to about 4000 mA.

According to an embodiment, in operation 560, the electronic device 101 may set a second target voltage different from the first target voltage, charge the battery 189 in the first mode operation, and then switch to the second mode operation in the second target voltage. For example, when the processor 120 sets the second charging state value to about 40%, when the state of charge of the battery 189 is about 20% or more and about 40% or less, the second step may be maintained. The processor 120 may set the second target voltage to about 4150 mV, which is about 96.5% of the full voltage. In addition, when the second reference current value is about 4000 mA, which is the rated charging current, the processor 120 may set the third reference current value to about 2400 mA, which is about 0.6 times of the rated charging current. In this case, the processor 120 may perform charging in the first mode operation through the power management module 188 until the voltage of the battery 189 becomes about 4150 mV, and then switch to the second mode operation at about 4150 mV. The power management module 188 may allow the charging current to be maintained about 4000 mA until the voltage of the battery 189 is about 4150 mV and then to be gradually decreased to about 2400 mA at about 4150 mV.

According to an embodiment, in operation 570, when the target voltage is a full voltage, the electronic device 101 may change the charging current in the second mode operation and then cut off the charging current. For example, when the target voltage reaches the full voltage of 4300 mV in the Nth step, the processor 120 may gradually decrease the charging current from about 2400 mA to a specified value and then cut off the charging current. When the target voltage is not the full voltage, the processor 120 may return to operation 520 and repeatedly perform operation from operation 520. The processor 120 may determine whether to move from the 'i'th step to an 'i'+1 step.

Figure 6:
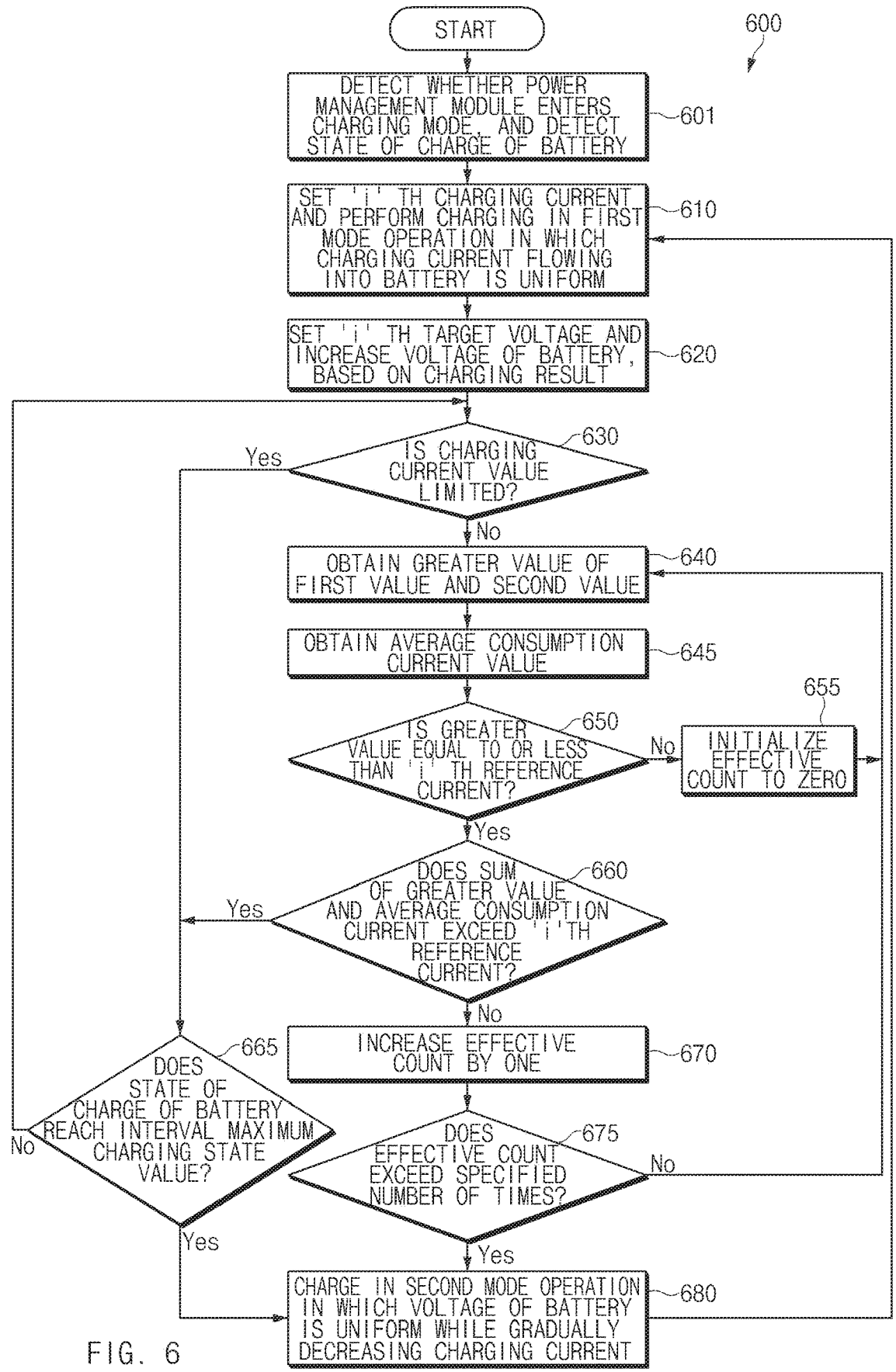
FIG. 6 is another flowchart describing a method of how an electronic device controls charging according to an embodiment of the disclosure.

FIG. 6 is another flowchart describing a method of how an electronic device (e.g., the electronic device 101 of FIG. 3) controls the charging according to an embodiment of the disclosure.

Referring to FIG. 6, according to an embodiment, in operation 601 of flowchart 600, the electronic device 101 may detect whether the power management module (e.g., the power management module 188 of FIG. 3) enters a charging mode, and detect the state of charge of the battery (e.g., the battery 189 of FIG. 3). For example, the processor (e.g., the processor 120 of FIG. 3) may detect whether the power management module 188 is connected to the external power source (e.g., the external power source 320 of FIG. 3). As another example, the processor 120 may detect whether the power management module 188 supplies the charging current to the battery 189. The power management module 188 may measure the current battery level of the battery 189, the battery charge amount, and/or the voltage of the battery 189.

According to an embodiment, in operation 610, the electronic device 101 may set the 'i'th (T is a natural number of 2 or more) charging current and perform charging in the first mode operation that operates in the constant current (CC) mode in which the charging current flowing into the battery 189 is uniform. The 'i'th charging current may be a charging current in the 'i'th charging interval of the plurality of charging intervals. The processor 120 may charge the battery 189 while maintaining the charging current that is set in the corresponding charging interval.

According to an embodiment, in operation 620, the electronic device 101 may set the 'i'th target voltage and increase the voltage of the battery 189, based on a charging result. The power management module 188 may charge the battery 189, based on the 'i'th charging current. The voltage of the battery 189 may increase to the 'i'th target voltage by the 'i'th charging current flowing into the battery 189. For example, the 'i'th target voltage may be a target voltage in the 'i'th charging interval among the plurality of charging intervals. In the first mode operation, the voltage of the battery 189 may increase to the 'i'th target voltage while uniformly keeping the charging current. The processor 120 may increase the voltage of the battery 189 in proportion to the charging time in the corresponding charging interval.

According to an embodiment, in operation 630, the electronic device 101 may determine whether the charging current value is limited. When the charging current value is limited (operation 630-Yes), an operation may proceed to operation 665. When the charging current value is not limited (operation 630-No), the operation may proceed to operation 640.

According to an embodiment, in operation 640, the electronic device 101 may obtain the greater value of a first value and a second value. The first value may be a current charging current in which a consumption current used in the electronic device 101 is reflected. The second value may be an average charging current for the specified time.

According to an embodiment, in operation 645, the electronic device 101 may obtain an average consumption current value. The processor 120 may perform operation 645 when the consumption current like a system current used by the electronic device 101 occurs in the state where the charging current is not limited. For example, when the system current value is greater than or equal to the specified value in a state where the display (e.g., the display device 160 of FIG. 1) is turned off, the processor 120 may measure the system current value through the power management module 188.

According to an embodiment, in operation 650, the electronic device 101 may determine whether the greater value of the first value and the second value is equal to or less than the 'i'th reference current. When the charging current value is not limited, the processor 120 may determine whether the greater value of the average charging current and the current charging current is equal to or less than the reference current value in the corresponding charging interval. When the greater value exceeds the 'i'th reference current (operation 650-No), the processor 120 may perform operation 655.

According to an embodiment, in operation 655, the electronic device 101 may initialize an effective count to zero. The processor 120 may initialize the effective count to prevent the charging from being performed in a subsequent charging interval when the greater value of the first value and the second value exceeds the 'th reference current. After initializing the effective count, the processor 120 may again perform operation 640 of obtaining the greater value of the first value and the second value and identifying whether the greater value is equal to or less than the i'th reference current.

The processor 120 may perform operation 660 when the greater value of the average charging current and the current charging current is less than or equal to the 'i'th reference current (operation 650-Yes).

According to an embodiment, in operation 660, the electronic device 101 may identify whether the sum of the greater value and the average consumption current exceeds the 'i'th reference current. When the sum of the greater value and the average consumption current exceeds the 'i'th reference current (operation 660-Yes), the processor 120 may proceed to operation 665. When the greater value of the first and second values, which represent the current flowing into the battery 189, is less than the 'i'th reference current, and the sum of the greater value of the first and second values and the consumption current such as the system current value is greater than the 'i'th reference current, the processor 120 may determine the operation mode from the first mode or the second mode based only on the maximum SoC (state of charge) value as in the case where the charging current is limited. For example, when the first charging current is 3200 mA, the first reference current is 2400 mA, the greater value of the first value and the second value is 2000 mA, and the system current is 1000 mA, the sum of the greater value of the first value and the second value (i.e., 2000 mA) and the system current (i.e., 1000 mA) is 3000 mA, which is greater than the first reference current (i.e., 2400 mA). Accordingly, the processor 120 may determine the operation mode from the first mode or the second mode based only on the maximum SoC value. When the sum of the greater value and the average consumption current is less than or equal to the i'th reference current (operation 660-No), the processor 120 may proceed to operation 670.

According to an embodiment, in operation 665, the electronic device 101 may determine whether the state of charge of the battery 189 reaches an interval maximum charging state value, when the charging current value is limited (operation 630-Yes) or when the sum of the greater value and the average consumption current exceeds the i'th reference current (operation 660-Yes). The processor 120 may compare the state of charge of the battery with the interval maximum charging state value when the charging current value is limited as illustrated in Table 2 below.

TABLE 2

| division | | first step | second step | Nth step |
|---|---|---|---|---|
| step-down condition | interval maximum charging state target voltage | first charging state value | second charging state value | Nth charging state value |
| allowable voltage, current | | first target voltage | second target voltage | Nth target voltage |

As illustrated in Table 2, the state in which the charging current is limited may be a state in which a circuit and/or algorithm for intentionally controlling a heat generation during the charging is applied. For example, when the display (e.g., the display device 160 of FIG. 1) is turned on, the charging current may be limited. Accordingly, by limiting a magnitude of the maximum charging current flowing into the battery 189, a rapid charging may not be required. In this case, the step-down condition from a certain charging interval or step to a subsequent step may be set to consider only the interval maximum charging state value. In each step, the interval maximum charging state value and the target voltage of the corresponding step may be set. For example, in the first step, the first charging state value may be about 30%, and the first target voltage may be about 4000 mV. As another example, in the second step, the second charging state value may be about 50% and the second target voltage may be about 4150 mV. As still another example, in the Nth step, the Nth charging state value may be about 100% and the Nth target voltage may be about 4350 mV.

According to an embodiment, the processor 120 may proceed to operation 680 when the state of charge of the battery 189 reaches the interval maximum charging state value (operation 665-Yes). When the state of charge of the battery 189 is equal to or less than the interval maximum charging state value (operation 665-No), the processor 120 may return to operation 630 and proceed with the charging process to reach the interval maximum charging state value.

According to an embodiment, in operation 670, the electronic device 101 may increase the effective count by one. The effective count may be a value that can be compared with the specified number of times to move from one of the plurality of charging intervals to the subsequent interval. The processor 120 may increase the effective count by one when the case where the greater value of the average charging current and the current charging current is less than the 'i'th reference current occurs once. The processor 120 may measure whether to increase the effective count at a specified period. The processor 120 may monitor the average charging current, the current charging current, the system current, the voltage of the battery 189 and/or the level of the battery 189 at the specified period. For example, the specified period may be about 30 seconds. However, the disclosure is not limited thereto, and the processor 120 may be configured to change the specified period depending on the use state or the state of charge of the electronic device 101.

According to an embodiment, in operation 675, the electronic device 101 may determine whether the effective count exceeds the specified number of times. For example, the processor 120 may determine whether the greater value of the first value and the second value consecutively exceeds the reference current value for the specified number of times or more. For example, the processor 120 may determine that the condition is valid when the effective count exceeds 3 since the condition is satisfied three times in succession. However, the disclosure is not limited thereto, and the processor 120 may be configured to change the specified number of times, based on the use state or the state of charge of the electronic device 101. The processor 120 may perform operation 680 when the effective count exceeds the specified number of times (operation 675-Yes). When the effective count is less than or equal to the specified number of times (operation 675-No), the processor 120 may return to operation 640 to obtain the greater value of the first value and the second value.

According to an embodiment, in operation 680, the electronic device 101 may charge in a second mode operation that operates in the constant voltage (CV) mode in which the voltage of the battery 189 is uniform while gradually decreasing the charging current. The processor 120 of the electronic device 101 may identify that the charging voltage reaches the target voltage in the current charging interval when the effective count exceeds the specified number of times or when the state of charge of the battery 189 reaches the interval maximum SoC value. The processor 120 may have an interval for maintaining the voltage of the battery 189 while gradually decreasing the charging current before setting the subsequent target voltage and moving to the subsequent charging interval.

Figure 7:
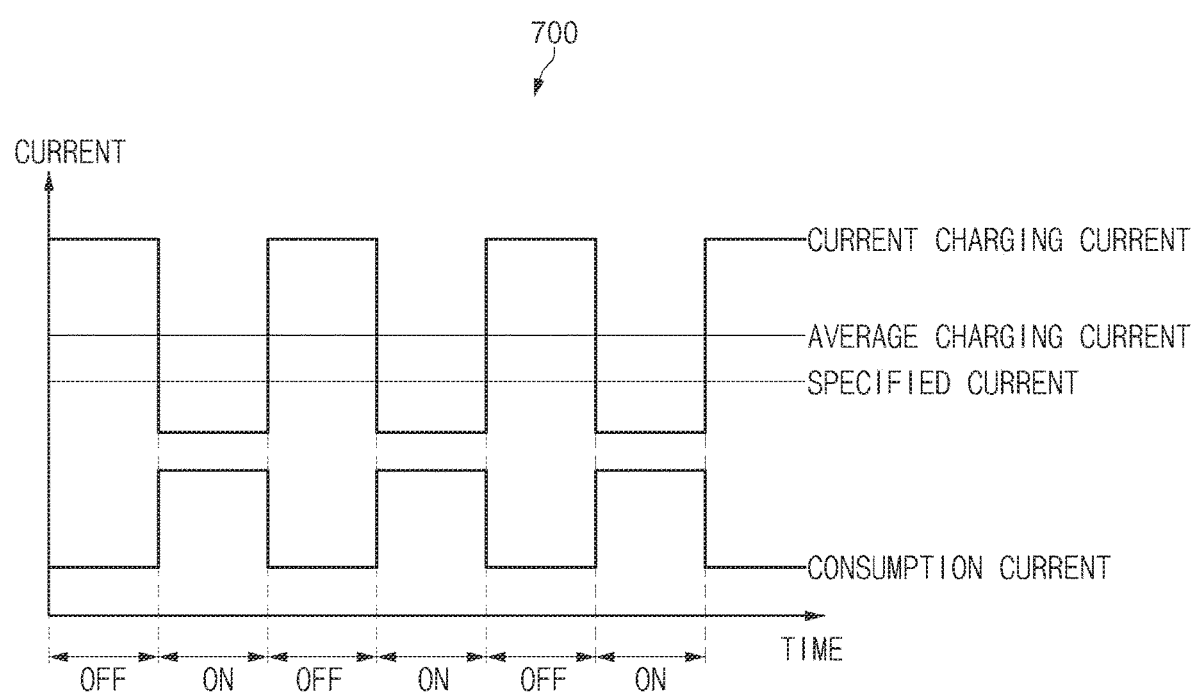
FIG. 7 is a graph illustrating an average charging current, a current charging current, and a consumption current, based on ON and OFF of a display of an electronic device according to an embodiment of the disclosure.

FIG. 7 is a graph illustrating an average charging current, a current charging current, and a consumption current, based on ON and OFF of the display (e.g., the display device 160 of FIG. 1) of an electronic device (e.g., the electronic device 101 of FIG. 3) according to an embodiment of the disclosure.

Referring to FIG. 7, according to an embodiment, graph 700 illustrates that a processor, such as the processor 120 of the electronic device 101, may obtain a greater value of the average charging current for the specified time from the power management module 188 and the current charging current that is a current excluding the consumption current of the electronic device 101. The processor 120 may be set to move from one charging interval to the subsequent charging interval when it is identified that the greater value of the average charging current and the current charging current is greater than the specified current consecutively for the specified number of times in the current charging interval. For example, the processor 120 may obtain a greater value of the first value, which is an intensity of the current charging current, and the second value, which is the average value of the charging current for the specified time (operation 640 of FIG. 6). The processor 120 may increase the effective count by one when the obtained greater value is less than or equal (operation 650-Yes of FIG. 6) to the 'i'th reference current (operation 670 of FIG. 6). When the effective count exceeds the specified number of times (operation 675-Yes of FIG. 6), the processor 120 may charge in the second mode in which the voltage of the battery is the constant mode while gradually decreasing the charging current (operation 680 of FIG. 6).

According to an embodiment, the processor 120 of the electronic device 101 may obtain the greater value of the average charging current and the current charging current that is a current excluding the consumption current of the electronic device 101 for the specified time. The processor 120 may be set to move to the subsequent charging interval when the obtained value is greater than the specified current for the specified number of times or more. For example, when the ON and OFF operations of the display 160 are repeatedly performed, an interval in which the consumption current occurs and an interval in which the consumption current does not occur in the electronic device 101 may be repeated. In a situation where the interval in which the consumption current changes is repeated, when only one of the average charging current or the current charging current flowing into the battery (e.g., the battery 189 of FIG. 3) is referenced, since it may move to the subsequent charging interval first after identifying only that a magnitude is greater than the specified current, an early step-down situation in which the step down of the charging current is abnormally fast may occur.

According to an embodiment, to prevent abnormally moving to the subsequent charging interval by referencing only one of the average charging current and the current charging current, the processor 120 may obtain the greater value of the average charging current and the current charging current and compare the greater value with the specified current value in the corresponding charging interval. For example, depending on the charging situation and/or usage situation of the electronic device 101, the specified current may be greater than the average charging current and less than the current charging current. The processor 120 may determine that it is valid only when the case of satisfying the condition occurs consecutively, thereby reducing the possibility of the early step-down due to the consumption current.

An electronic device (e.g., the electronic device 101 of FIG. 3) according to various embodiments includes a housing (e.g., the housing 310 of FIG. 3), a battery (e.g., the battery 189 of FIG. 3) disposed inside the housing 310, a power management module (e.g., the power management module 188 of FIG. 3) that controls the battery 189, a processor (e.g., the processor 120 of FIG. 3) operationally connected with the battery 189 and the power management module 188. The processor 120 may have a plurality of charging intervals (e.g., the first to third intervals of FIG. 4) while charging the battery 189. Each of the plurality of charging intervals (the first to third intervals) may have a target voltage (e.g., the first to third target voltages V1 to V3 of FIG. 4). The processor 120 may alternately charge the battery 189 in a first mode and in a second mode through the power management module 189, wherein a charging current flowing into the battery is uniformly maintained (constant current, CC) in the first mode and a voltage of the battery is uniformly maintained (constant voltage, CV) in the second mode. The processor 120 may switch the first mode to the second mode when the voltage of the battery 189 reaches the target voltage in the first mode.

According to an embodiment, the processor 120 may be set to move from a charging interval charged in the first mode to a charging interval charged in the second mode when a state of charge (SoC) of the battery 189 reaches a minimum charging state value.

According to an embodiment, when it is determined that a greater value of a first value that is a current charging current reflecting a consumption current used by the electronic device 101 and a second value that is an average of the charging current is less than an 'i' (the 'i' is a natural number of 2 or more) reference current consecutively for a specified number of times or more in any one charging interval, the processor 120 may be set to move from one of the plurality of charging intervals to a subsequent charging interval.

According to an embodiment, the processor 120 may be set to gradually change the charging current in the second mode.

According to an embodiment, when the reached target voltage is less than a full voltage at which the battery 189 is fully charged, the processor 120 may be set to move to a subsequent charging interval after the second mode of any one of the plurality of charging intervals ends and to start the first mode.

According to an embodiment, when the greater value of the first value that is the current charging current reflecting the consumption current used by the electronic device 101 and the second value that is the average of the charging current is greater than the 'i'th reference current, the processor 120 may be set to initialize an effective count that determines whether to move from one of the plurality of charging intervals to a subsequent charging interval.

According to an embodiment, when the reached target voltage is a full voltage at which the battery 189 is fully charged, the processor 120 may be set to gradually block the charging current after entering the second mode.

According to an embodiment, when the charging current is not limited and the state of charge of the battery 189 reaches an interval maximum value in a corresponding charging interval, the processor 120 may be set to enter a subsequent charging interval.

A method of charging the battery 189 of the electronic device 101 according to various embodiments may include performing (e.g., operation 510 of FIG. charging in a first mode in which first charging current is uniformly maintained in a first interval having a first target voltage, identifying (e.g., operation 520 of FIG. 5) whether a state of charge (SoC) of the battery reaches a first charging state value, obtaining (e.g., operation 530 of FIG. 5) a first value that is a charging current flowing into the battery 189 and a second value that is an average value of the charging current flowing into the battery 189 for a specified time, identifying (e.g., operation 540 of FIG. whether a greater value of the first value and the second value is less than a first reference current value for a specified number of times or more, performing (e.g., operation 550 of FIG. 5) charging in a second mode in which the first target voltage is maintained while gradually changing the first charging current to a second charging current, performing charging in the first mode by entering a second interval having a second target voltage different from the first target voltage, and switching (e.g., operation 560 of FIG. 5) the first mode to the second mode when a voltage of the battery reaches the second target voltage.

According to an embodiment, the method may further include entering a third interval having a third target voltage different from the second target voltage, and when the third target voltage is a full voltage at which the battery is fully charged, changing the charging current while switching from the first mode to the second mode, and then blocking (e.g., operation 560 of FIG. 5) the charging current.

According to an embodiment, the first charging state value may be a minimum charging state value in the first interval, and when the state of charge reaches the first charging state value, the second interval may be entered.

According to an embodiment, when the charging current value is not limited, a greater value of the first value and the second value is obtained.

According to an embodiment, the method may include identifying (e.g., operation 650 of FIG. 6) whether the greater value of the first value and the second value is equal to or less than a reference current in the first interval, and increasing (e.g., operation 670 of FIG. 6) an effective count when the greater value is equal to or less than the reference current.

According to an embodiment, the method may include charging (e.g., operation 680 of FIG. 6) in the second mode while gradually decreasing the charging current when the effective count exceeds a specified number of times.

According to an embodiment, the method may include identifying (e.g., operation 665 of FIG. 6) whether the state of charge of the battery reaches an interval maximum charging state value when the charging current value is limited (e.g., operation 630-Yes of FIG. 6), and charging (operation 680) in the second mode while gradually decreasing the charging current when the state of charge reaches the interval maximum charging state value (e.g., operation 665-Yes of FIG. 6).

An electronic device 101 according to various embodiments includes a housing 310, a battery 189 disposed inside the housing 310, a power management module188 that controls the battery 189, and a processor 120 operationally connected with the battery 189 and the power management module 188. The processor 120 may set a plurality of target voltages (the first to third target voltages V1 to V3 of FIG. 4) for a plurality of charging intervals (e.g., the first to third intervals of FIG. 4), respectively, identify whether a voltage of the battery reaches a target voltage in a corresponding charging interval among the plurality of target voltages (V1 to V3 while charging the battery 189 in a first mode in which a charging current of the battery is uniformly maintained, obtain a first value that is a strength of a current charging current and a second value that is an average value of the charging current for a specified time, identify whether a greater value of the first value and the second value is equal to or less than a first reference current value for a specified number of times or more, and maintain the target voltage while gradually changing a first charging current to a second charging current that is less than the first charging current to switch the first mode in which the first charging current is uniformly maintained to a second mode in which the target voltage is uniformly maintained, in a first interval of the plurality of charging intervals.

According to an embodiment, when it is determined that the greater value of a first value that is a current charging current reflecting a consumption current used by the electronic device and a second value that is an average of the charging current is greater than the first reference current consecutively for the specified number of times or more in the first interval, the processor 120 may move from the first interval to the second interval among the plurality of charging intervals.

According to an embodiment, when the target voltage is a full voltage at which the battery 189 is fully charged, the processor 120 may block the charging current after the charging current is changed in the second mode.

According to an embodiment, the processor 120 may be set to identify whether the greater value of the first value and the second value is equal to or less than a reference current in a corresponding interval, and to increase an effective count when the greater value exceeds the reference current.

According to an embodiment, the processor 120 may be set to perform charging in the second mode while gradually decreasing the charging current when the effective count exceeds the specified number of times.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments of the disclosure, a battery may be charged while preventing overheating of the battery by setting different target voltages in a plurality of charging intervals.

According to various embodiments of the disclosure, by gradually decreasing the charging current in a second mode in which the voltage of the battery is maintained uniform after a first mode in which the voltage of the battery increases among a plurality of charging intervals, the battery may be charged without loss of charging time.

In addition, various effects may be provided that are directly or indirectly identified through the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a battery disposed inside the housing;
   a power management circuit configured to control charging the battery; and
   at least one processor operationally connected with the battery and the power management circuit,
   wherein the at least one processor is configured to:
      charge the battery in a first mode through the power management circuit during a first charging interval of a plurality of charging intervals, wherein a charging current reflecting a consumption load current used by the electronic device and flowing into the battery remains the same while charging the battery in the first mode when a consumption load current of the electronic device is low and wherein the charging current flowing into the battery does not remain the same while charging the battery in the first mode when the consumption load current of the electronic device is high,
      switch from the first mode to a second mode when a voltage of the battery reaches a target voltage of the first charging interval,
      charge the battery in the second mode through the power management circuit during the first charging interval, wherein the voltage of the battery is maintained at the target voltage while charging the battery in the second mode, and
      switch from the first charging interval to a subsequent charging interval of the plurality of charging intervals when a current flowing into the battery reaches a target current of the first charging interval,
   wherein, to switch from the first mode to the second mode, the at least one processor is configured to:
      repeatedly identify a first value of a charging current presently flowing into the battery and a second value of an average of the charging current flowing into the battery during the first charging interval, and an average value of the consumption load current during the first charging interval,
      determine a greater value from among the first value of the charging current presently flowing into the battery and the second value of the average of the charging current flowing into the battery,
      based on the greater value exceeding a first reference current of the first charging interval, initialize an effective count to zero, wherein the first reference current is different from the charging current flowing into the battery that remains the same while charging the battery in the first mode,
      based on a sum of the greater value and the average value of the consumption load current being less than or equal to the first reference current, increase the effective count by one, and
      based on the effective count exceeding a specified number of a plurality of times, switch from the first charging mode to the charging mode,
   wherein each subsequent charging interval of the plurality of charging intervals includes a corresponding first mode in which the charging current flowing into the battery remains the same and a corresponding second mode in which the voltage of the battery remains the same, and
   wherein the first mode is a constant current charging mode and the second mode is a constant voltage charging mode.

2. The electronic device of claim 1,
   wherein the at least one processor is further configured to: determine a state of charge of the battery, and
   wherein the switch from the first mode to the second mode is further based on the state of charge of the battery reaching a minimum charging state value.

3. The electronic device of claim 1,
   wherein the switch from the first charging interval to the subsequent charging interval of the plurality of charging intervals is further based on:
      the greater value being less than the first reference current of the first charging interval consecutively for a specified period of time during the first charging interval, and
      a reached target voltage being less than a full voltage at which the battery is fully charged.

4. The electronic device of claim 1, wherein the at least one processor is further configured to:
   based on determining that a reached target voltage is a voltage at which the battery is fully charged, gradually block the charging current after entering the second mode.

5. The electronic device of claim 1, wherein the at least one processor is further configured to:
   based on determining that the charging current is not at a limited level due to a present state of the electronic device and a state of charge of the battery reaches an interval maximum value in the first charging interval, enter the subsequent charging interval.

6. The electronic device of claim 1, wherein a gradual decrease of the charging current during the second mode is performed by maintaining the voltage of the battery and decreasing the charging current based to an inverse function, an exponential function, or a logarithmic function to maintain the voltage of the battery the same.

7. The electronic device of claim 6, wherein the at least one processor is further configured to:
   gradually decrease the charging current from a first charging current (I1) to a second charging current (I2) while maintaining the voltage of the battery as a first target voltage (V1) from a first time (T1) to a second time (T2),
   gradually decrease the charging current from the second charging current (I2) to a third charging current (I3) while maintaining the voltage of the battery as a second target voltage (V2) from a third time (T3) to a fourth time (T4), and
   gradually decrease the charging current from the third charging current (I3) to a fourth charging current (I4) while maintaining the voltage of the battery as a third target voltage (V3) from a fifth time (T5) to a sixth time (T6).

8. The electronic device of claim 1,
   wherein the voltage of the battery is increased in the first mode and a charging speed is increased, and
   wherein the charging current is decreased in the second mode and the charging speed is decreased.

9. A method of charging a battery of an electronic device, the method comprising:
   performing charging in a first mode in which first charging current reflecting a consumption load current user by the electronic device remains the same during a first interval of a plurality of intervals when a consumption load current of the electronic device is low, and in which the first charging current does not remain the same during the first interval when the consumption load current of the electronic device is high;
identifying whether a state of charge (SoC) of the battery reaches a first charging state value;
switching from the first mode to a second mode when a voltage of the battery reaches a first target voltage of the first interval;
obtaining a first value that is a charging current presently flowing into the battery and a second value of an average value of the charging current flowing into the battery during the first interval;
performing charging in the second mode in which a first target voltage is maintained at the first target voltage while gradually changing the first charging current to a second charging current; and
switching from the first interval to a subsequent second interval of the plurality of intervals when a current flowing into the battery reaches a target current of the first interval,
wherein the switch from the first mode to the second mode comprises:
repeatedly identifying a first value of a charging current presently flowing into the battery and a second value of an average of the charging current flowing into the battery during the first interval, and an average value of the consumption load current during the first interval;
determining a greater value from among the first value and the second value;
based on the greater value exceeding a first reference current of the first interval, initializing an effective count to zero, wherein the first reference current is different from the charging current flowing into the battery that is remains the same while charging the battery in the first mode;
based on a sum of the greater value and an average value of the consumption load current during the first interval being less than or equal to the first reference current, increasing the effective count by one; and
based on the effective count exceeding a specified number of a plurality of times, switching from the first mode to the second mode;
wherein the subsequent second interval of the plurality of intervals includes a corresponding first mode in which the charging current flowing into the battery remains the same and a corresponding second mode in which the voltage of the battery remains the same, and
wherein the first mode is a constant current charging mode and the second mode is a constant voltage charging mode.

10. The method of claim 9, further comprising:
based on determining that a reached target voltage is a voltage at which the battery is fully charged, gradually blocking the charging current after entering the second mode.

11. The method of claim 9,
wherein the first charging state value is a minimum charging state value in the first interval, and
wherein the switching from the first interval to the subsequent second interval is further based on SoC reaching the first charging state value.

12. The method of claim 9, wherein, the determining of the greater value is based on determining that the charging current is not at a limited level due to a present state of the electronic device.

13. The method of claim 9, wherein the method further comprises:
identifying whether the SoC of the battery reaches an interval maximum charging state value when a charging current value is limited level due to a present state of the electronic device; and
charging in the second mode while gradually decreasing the charging current when the SoC reaches the interval maximum charging state value.

14. An electronic device comprising:
a housing;
a battery disposed inside the housing;
a power management circuit configured to control charging the battery; and
at least one processor operationally connected with the battery and the power management circuit,
wherein the at least one processor is configured to:
set a plurality of target voltages and a plurality of reference currents for a plurality of charging intervals, respectively,
identify whether a voltage of the battery reaches a first target voltage of the plurality of target voltages in a first charging interval of the plurality of charging intervals, while charging the battery in a first mode in which a first charging current of the battery reflecting a consumption load current used by the electronic device remains the same when a consumption load current of the electronic device is low, and in which the first charging current does not remain the same during the first charging interval when the consumption load current of the electronic device is high, and
maintain the first target voltage while gradually changing the first charging current to a second charging current that is less than the first charging current to switch the first mode to a second mode in which the first target voltage remains the same, in the second mode,
wherein, to switch from the first mode to the second mode, the at least one processor is configured to:
repeatedly obtain a first value of a strength of a charging current presently flowing into the battery, a second value of an average of the charging current flowing into the battery during the first charging interval, and an average value of the consumption load current during the first charging interval,
determine a greater value from among the first value and the second value,
based on the greater value exceeding a first reference current of the first charging interval, initialize an effective count to zero, wherein the first reference current is different from the charging current flowing into the battery that remains the same while charging the battery in the first mode,
based on a sum of the greater value and the average value of the consumption load current being less than or equal to the first reference current, increase the effective count by one, and
based on the effective count exceeding a specified number of a plurality of times, move from the first mode to the second mode, and
wherein the first mode is a constant current charging mode and the second mode is a constant voltage charging mode.

15. The electronic device of claim 14, wherein the at least one processor is further configured to:

identify when the first target voltage is a voltage at which the battery is fully charged, and based on the identification, block the charging current after the charging current is changed during the second mode.

\* \* \* \* \*